United States Patent [19]

Navarrini et al.

[11] Patent Number: 5,196,595
[45] Date of Patent: Mar. 23, 1993

[54] POLYPERFLUOROAMINOETHERS

[75] Inventors: Walter Navarrini, Boffalora, Italy; Darryl D. Desmarteau, Clemson, S.C.

[73] Assignee: Ausimont S.R.L., Milan, Italy

[21] Appl. No.: 877,280

[22] Filed: Apr. 28, 1992

Related U.S. Application Data

[63] Continuation of Ser. No. 811,921, Dec. 23, 1991, abandoned, which is a continuation of Ser. No. 340,512, Apr. 19, 1989, abandoned.

[30] Foreign Application Priority Data

Apr. 22, 1988 [IT] Italy .................. 20290 A/88

[51] Int. Cl.$^5$ .............. C07C 217/26; C07C 217/40
[52] U.S. Cl. ........................ 564/504; 564/37; 564/59; 564/209; 564/225; 564/240; 564/279; 564/487; 564/502; 564/505; 564/508; 564/510
[58] Field of Search ............. 564/37, 59, 209, 225, 564/240, 279, 487, 502, 504, 505, 508, 510

[56] References Cited

U.S. PATENT DOCUMENTS

| | | | |
|---|---|---|---|
| 3,812,206 | 5/1974 | Banks et al. | 564/301 X |
| 3,882,182 | 5/1975 | Benninger et al. | 564/510 X |
| 3,965,184 | 6/1976 | Banks et al. | 564/301 X |
| 4,626,608 | 12/1986 | Scherer et al. | 570/134 |
| 4,736,004 | 4/1988 | Scherer et al. | 570/134 |
| 4,788,339 | 11/1988 | Moore et al. | 564/504 X |
| 4,921,957 | 5/1990 | Malacrida et al. | 564/487 X |
| 4,933,470 | 6/1990 | Jones | 564/487 X |

FOREIGN PATENT DOCUMENTS 0353721  2/1990  European Pat. Off. ............ 564/301

OTHER PUBLICATIONS

Banks et al, Chemical Abstracts, vol. 95, #61366g (1981).
Sekiya et al, Chemical Abstracts, vol. 93, #70905t (1980).
Journal of Organic Chemistry, vol. 51, 1986, pp. 4466-4470; "Cyclo-addition and Oxygen-Transfer Reactions of 2-(trifluoromethyl)-3,3-difluorooxaziridine".
Tetrahedron Letters, vol. 22, 1981, Pergamon Press, GB, pp. 917-920; "Epoxidation of olefins by oxaziridines".

Primary Examiner—Richard L. Raymond
Attorney, Agent, or Firm—Morgan & Finnegan

[57] ABSTRACT

New perfluoroaminoether polymers and a process for preparing them which comprises copolymerizing fluorinated olefins with oxaziridines in the presence of ultraviolet radiations or of chemical initiators.

18 Claims, No Drawings

POLYPERFLUOROAMINOETHERS

This is a continuation of co-pending application Ser. No. 07/811,921, filed on Dec. 23, 1991, now abandoned, which is a continuation of co-pending application Ser. No. 07/340,512, filed on Apr. 19, 1989, now abandoned.

BACKGROUND OF THE INVENTION

This invention relates to perfluoroaminoether polymers and to a process for preparing them. In particular, there are described new perfluoroaminoether polymers, and the process for preparing them, which are obtained by copolymerization of fluorinated olefins with oxaziridines, in particular in the presence of ultra-violet radiations or of chemical initiators.

The new perfluoroaminoether polymers of the present invention contain the perfluoroaminic units statistically distributed along the polymeric chain.

Tertiary amines containing in their chain perfluoroalkyl groups bound by ethereal oxygen atoms are known.

For example, U.S. Pat. No. 3,882,178 relates to fluorinated tertiary amines containing ethereal bonds, prepared by reacting non-fluorinated aminoalcohols with tetrafluoroethylene and subsequent electrochemical fluorination. In this case, however, the aminic groups are present only as polymer end groups.

U.S. Pat. No. 3,997,607 teaches how to prepare aminoethers by electrochemical fluorination of the reaction product of a tertiary amine having hydroxyethyl groups with hexafluoropropene.

European patent application No. 214,852 teaches how to prepare perfluoroaminoether products characterized by 2 or 3 tertiary aminic nitrogen atoms as end groups, bound to perfluoropolyethereal units of type —C₂F₄—O—C₂F₄ or of type:

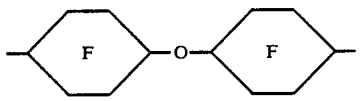

said products being obtained by electrochemical fluorination of the corresponding partially hydrogenated precursors.

However, also these products possess the units containing N as end groups, as mentioned above with reference to U.S. Pat. No. 3,888,178.

The products of the present invention cannot be considered as perfluoroethers having perfluoroalkylaminic groups as end groups, but polymers characterized by repeating units distributed at random in the chain, such as, for example:

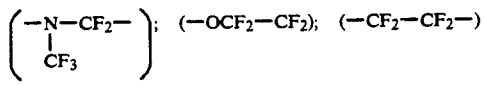

Furthermore, the process for preparing the polymers of the present invention does not regard the electrochemical fluorination of hydrogenated compounds, but the reaction of perfluoroolefins with perfluorooxaziridines in the presence of ultra-violet radiations or, as an alternative, in the presence of proper chemical initiators or starter compounds acting as a catalyst, such compounds being selected among peroxy compounds and perfluoroalkyl radical generators.

U.S. Pat. No. 4,287,128 describes the preparation of oxaziridines of type:

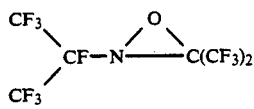

generally discussing the possibility of polymerizing these compounds, without giving, however, any specific indication on the polymerization or copolymerization of the oxaziridines.

The article by B. O. Brien, W. Lam and D. D. Desmarteau in J. Org. Chem. vol. 51, No. 3, 1986, contains an exhaustive study on the reactivity of oxaziridine:

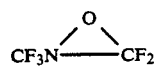

towards various 1,1-difluoroolefins.

According to the results of such study, the above-described oxaziridine does not polymerize, but provides cycloaddition products with most of the 1,1-difluoroolefins, so forming perhalo-1,3-oxazolidines.

For example, by means of an 18-hour heat-treatment at 55°–100° C., from an equimolecular amount of $CF_2=CF_2$ and oxaziridines of type:

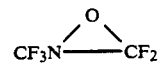

it is possible to obtain, with a satisfactory yield (60%), a cyclic product, i.e. perfluoro-3-methyloxazolidine, and no traces of oil, namely of polymer. Conversely, the reaction of: $CF_3CF=CF_2$ with

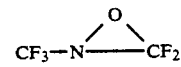

at 150° C. for 18 hours does not provide traces of oxazolidine and exhibits the formation of a non-volatile oil.

Thus, polymers obtained from oxaziridines do not result to be described or inferable from the prior art.

The Applicant has surprisingly found that it is possible to prepare polymers with perfluorinated olefins if a specific process is utilized, in particular if the polymerization reaction is conducted during suitable stretches of time in the presence of UV radiations, having a wavelength ranging from 2000 A° to 6000 A°, or, as an alternative, in the presence of suitable starters chosen among peroxy compounds and perfluoroalkyl radicals generators of precursors.

Thus, an object of the present invention are perfluoroaminoethers having the following general formula:

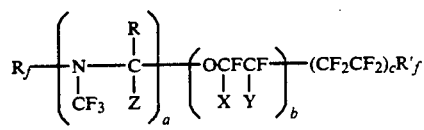

wherein $R_f$ and $R'_f$, like or different from each other, represent:

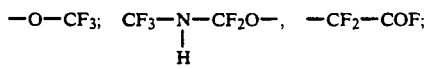

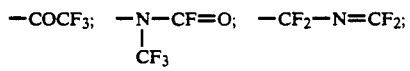

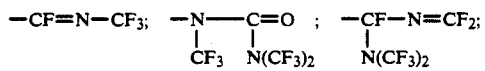

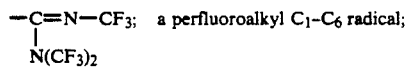

a perfluoroalkyl $C_1$-$C_6$ radical;
a, b, are integers and c an integer or zero;
$a+b+c \geq 2$
$a = 1$
$c \geq 0$
said repeating units being like or different and statistically distributed along the polymer chain;
Z represents F or

or a $C_1$-$C_{10}$ perfluoroalkyl group;
R represent F or a $C_1$-$C_{10}$ perfluoroalkyl group, like or different from Z;
X and Y:

a) when at least one of R and Z is different from F, represent F and $CF_3$, so that if X=F is Y=$CF_3$ or viceversa and c=0, or represent both F:

b) when R=Z=F, X represents F and Y represents a perfluoroalkyl $C_1$-$C_5$ group or viceversa and c=0, or represent both F.

When relatively low molecular weight polymers are obtained, e.g. ranging from 450 to 20.000 about, and in particular from 600 to 5000 about, there is approximately:
$2 \leq a+b+c \leq 200$
$1 \leq b+c \leq 50$
$0 \leq C \leq 100$.

While in the case of higher molecular weight polymers, aprroximately there is c>a and, e.g. $50 \leq b+c/a \leq 100$, with a
ΔH crystallization factor comprised between 5 and 70 about, expressed as Joules/g.

The perfluoroaminoethers of the present invention are prepared by reaction of oxaziridines of formula (1):

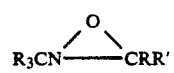

wherein each R represents F or a perfluoroalkyl group having from 1 to 10 carbon atoms and R' is F or the group:

or a perfluoroalkyl group having from 1 to 10 carbon atoms, with a perfluoroolefin chosen between perfluoropropene and perfluoroethylene, at temperatures ranging from −80° C. to 120° C. in the presence of ultra-violet radiation having a wave-length from 2000 to 6000 A°. Preferably, the temperature ranges from −50° to +50° C.

Among the oxaziridines described, particularly preferred is 2-(trifluoromethyl)-3,3-difluoro-oxaziridine (II):

or 2-(trifluoromethyl)-3-(N,N-bis-trifluoromethyl)-oxaziridine (111):

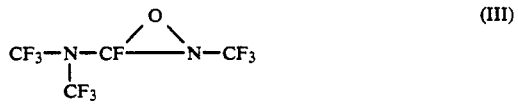

The oxaziridines constituting the starting materials of the present invention are known compounds and are preparable according to the methods described in the already cited U.S. Pat. No. 4,287,128 or by Falardeau, Desmarteau, J. Am. Chem. Soc. 1976, 98, 3529 or in Italian patent application No. 22,576 A/87 in the name of the Applicant hereof.

As it is known, the reaction time is a function of the other reaction parameters and it is generally of about 1-24 hours.

As already mentioned hereinbefore, in order to obtain the polymerization which is the object of this invention, it is necessary to have a combination of the above-indicated temperature and UV radiation values.

A further object of the present invention is an alternative process for preparing the above-described perfluoroaminoethers, which comprises a thermal treatment of said perfluoroolefins at a temperature of from 0° to 200° C. in the presence of catalytic amounts of a chemical starter or initiator selected among peroxy compounds and perfluoroalkyl radical generators.

Such chemical starters or initiators must be able to start polymerization of the perfluoroethylene by giving rise to free radicals (peroxy compounds) or by decomposing themself at the reaction temperature in perfluoroalkyl radical (perfluoroalkyl radical generators).

The peroxy compounds used in the present invention and the teachings useful to the preparation of same are well known; in particular they are described in the already cited publication by Falardeau, Desmarteau J. Am. Chem. Soc. 1976, 98, 3529.

For example, it is possible to use peroxides such as $CF_3-NH-CF_2-O-OCF_3$.

The perfluoroalkyl radical generators, used according to the invention, are per se known compounds. They are described for instance, in E.P. No. 121,898 and in italian pat. appln. No. 20,061 A/87.

While no limit was found as to composition of the generated perfluorinated radicals, radicals containing up to 6 carbon atoms have shown operative.

For example, if is possible to use perfluoroalkyl radicals generators such as:

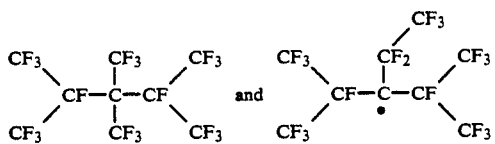

As above mentioned, the chemical precursor (peroxy or perfluoroalkyl radical generator compounds) are employed in catalytic amounts comprised e.g. between 0.5% and 5% by weight in respect of the reaction mixture.

As to reaction pressure it is possible to operate at atmospheric or higher pressure, if necessary, for example as high as 50 atm.

When the oxaziridine (II) is employed, the perfluoroolefin reactant may be a perfluoroolefin of formula:

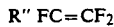
R″ FC=CF$_2$ wherein R″ is F or a perfluoroalkyl group having 1 to 5 carbon atoms.

Finally the processes above shown can also be carried out by operating in a suitable solvent, e.g. chosen among chlorocarbon solvents.

The perfluoroaminoethers of the present invention exhibit characteristics of high chemical inertia and high thermal stability, which render them particularly useful as lubricating oils, molding polymers. In particular, such oils, thanks to the low pour point values obtainable (ranging from −5° C. to −90° C.) and to the narrow boiling point range, can be utilized also as fluids for the vapor or liquid phase heating in the electronic industry.

EXAMPLES

The following examples are given merely to illustrate but not to limit the present invention.

EXAMPLE 1

Into a glass reactor having a volume of 280 ml there were charged 3 g of oxaziridine (II) (20 mmoles) and 2 g of tetrafluoroethylene (20 mmoles).

The calculated initial total pressure was of 3.5 kg/cm$^2$ abs. The reactor so charged was subjected to the action of the ultra-violet radiation during 4 hours at a temperature of 25° C., utilizing a Hanau lamp TQ, 150 watt.

From the reaction raw products, after distillation of the most volatile fractions and stripping at 50° C. for 3 hours, there were isolated 2.6 g of an oil, the elemental analysis of which was in accordance both with the suggested structures and with the quantitative analysis of the unreacted gases.

The polymerization yield, defined as the ratio between the amount in grams of polymer obtained and the summation of the amounts in grams of the individual monomers was equal to 52%.

Chemico-Physical Properties of the Product Obtained In Example 1.

Average molecular weight: 3100.

Elemental analysis: C=20%, N=4.3%; F=69.8%.

Infrared spectrum—main absorption bands: cm$^{-1}$ (intensity), 1890 (vw), 1317 (vs), 1260 (s), 1199 (vs), 1085 (vs), 989 (s), 923 (m); wherein vs=very strong, s=strong, m=medium, w=weak, vw=very weak.

NMR $^{19}$F spectrum, main chemical shifts (internal reference CFCl$_3$):

Trifluoromethyl groups on nitrogen (N—CF$_3$): −51.0 ppm

Difluoromethylene groups between nitrogen and oxygen (N—CF$_2$—O): −52.5 ppm

Difluoromethylene groups in chain Cf—(CF$_2$)$_n$—Cf (Cf being a perfluorinated radical): −120.0-130.0 ppm

EXAMPLE 2

(Comparative Test)

Into a glass reactor having a volume of 280 ml there were charged 3 g of oxaziridine (11) (20 mmoles) and 20 g of tetrafluoroethylene (20 mmoles).

The calculated initial total pressure was equal to 3.5 kg/cm$^2$ abs. The reactor so charged was heated to 50° C. in the absence of light for 24 hours.

The reaction raw product was distilled at a pressure of 10$^{-3}$ torr.

The vapors coming from the distillation vessel were made to flow through cold traps maintained at temperatures of −110° C. and −196° C. respectively.

In the trap at −110° C., 15 mmoles of perfluoro-3-trifluoromethyl-oxazolidine, a cyclic dimer of the reagents, were condensed, and in the trap at −196° C., 10 mmoles of an equimolecular mixture of unreacted tetrafluoroethylene and oxaziridine (I) were condensed. Conversely, polymers or oils were fully absent.

EXAMPLE 3

Into a quartz reactor of 140 ml volume there were charged 1.5 g of oxaziridine (II) (10 mmoles) and 1 g of tetrafluoroethylene (10 mmoles).

The calculated total pressure was of 3.5 kg/cm$^2$ abs.

Analogously with example 1, the reactor so charged was subjected to the action of ultraviolet light for a time of 4 hours at a temperature of −10° C.

From the reaction raw product, after distillation of the most volatile fractions and stripping at 50° C. for a 3-hour time, there were isolated 1.2 g of a perfluorinated oil having the following elemental analysis:

C=20.0%: N=4.7%; F=68.9%.

The polymerization yield, defined as in example 1, was equal to 48%.

EXAMPLE 4

Comparative Test

Into a glass reactor having a volume of 280 ml there were charged 3 g of oxaziridine (II) (20 mmoles) and 3 g of perfluoropropene (20 mmoles).

The calculated starting total pressure was of 3.5 kg/cm$^2$ abs. The reactor so charged was heated to 150° C. for 24 hours in the absence of light.

The reaction raw product was distilled at a pressure of 10$^{-3}$ torr.

The vapors flowing from the distillation vessel were conveyed through cold traps maintained at temperatures of −110° C. and −196° C. respectively.

In the trap at −110° C., 16 mmoles of 3,4-di(trifluoromethyl)perfluorooxazolidine were condensed. In the trap at −196° C., 5 mmoles of a gas mixture, the main components of which were the reactive gases, were condensed. Among the reaction products, polymers or oils were absent.

EXAMPLE 5

Into a glass reactor having a volume of 140 ml, there were charged 1.5 g of oxaziridine (II) (10 mmoles), 1 g of perfluoropropene (10 mmoles) and 15 mg of the perfluorinated peroxide $CF_3-N(H)CF_2O-O-CF_3$.

The calculated total pressure was equal to 3.5 kg/cm$^2$ abs.

The reactor so charged was heated to 100° C. for 24 hours in the absence of light.

From the reaction raw product, after distillation of the most volatile fractions and stripping at 50° C. for a 3 hour time, there were isolated 1.3 g of a perfluorinated oil, the elemental analysis of which was in accordance with both the suggested structures and the quantitative analysis of the unreacted gases.

The polymerization yield, defined as the ratio between the amount in grams of polymer obtained and the summation of the amounts in grams of the individual monomers, was equal to 43%.

Chemico-Physical Characteristics of the Product Obtained In Example 5.

Average molecular weight: 1950.

Elemental anlysis: C=20%; N=4.1%; F=69%.

Infrared spectrum—main absorption bands: cm$^{-1}$ (intensity), 1892 (vw), 1311 (vs), 1225 (vs), 1192 (vs), 1149 (s), 1085 (s), 995 (m), 979 (s), wherein vs =very strong, s=strong, m=medium, w=weak, vw=very veak.

NMR spectrum $^{19}$F main chemical shifts (internal reference CFCl$_3$):

Trifluoromethyl groups on nitrogen (N—CF$_3$):−52 ppm

Difluoromethylene groups between nitrogen and oxygen (N—CF$_2$—O)−46/−56 ppm

Trifluoromethyl groups on carbon (—CF(CF$_3$)—):−78/−80 ppm

Difluoromethylene groups on nitrogen or oxygen (CF$_2$—N, —CF$_2$—O):−80/−95 ppm Monofluoromethine groups:

−139/−150 ppm

EXAMPLE 6

Into a steel reactor having a volume of 14.3 ml, there were charged 1.5 g of oxaziridine (II) (10 mmoles), 1,5 g of perfluoropropene (10 mmoles) and 15 mg of a perfluorinated peroxide having a low decomposition temperature, (CF$_3$-N(H)CF$_2$—OO—CF$_3$).

The calculated total pressure, at 100° C., was of 43 kg/cm$^2$ abs. The reactor so charged was heated to 100° C. for 24 hours in the absence of light.

From the reaction raw product, after distillation of the most volatile fractions and stripping at 50° C. for a 3-hour time, there were isolated 1.9 g of perfluorinated oil, having the same characteristics of the product of example 5, with the exception of the molecular weight, which was equal to 2250. The polymerization yield defined as in example 1 was of 63%.

EXAMPLE 7

Into a quartz reactor having a volume of 30 ml there were charged 0.71 g of oxaziridine (III) (2.5 mmoles), 0.25 g of tetrafluoroethylene (2.5 mmoles), 3 ml of CFCl$_3$ as solvent and then irradiated during 5 hours at 0° C. utilizing a Hanau Lamp TQ, 150 W.

From the crude reaction mixture, after distillation of the most volatile products and stripping at 70° C. for 3 hours, there were isolated 0,19 g of a white solid polymer.

Polymerization yield: 19.8%

Elemental analysis: C=23.7%; N=0.23%; F=71.8%.

Infrared spectrum—main absorption bands: cm$^{-1}$ (intensity), 2361 (w), 1634 (w), 1238 (vs), 1156 (vs), 986 (w, stretching CF$_3$—N), 505 (s); vs=very strong, s=strong, w=weak.

EXAMPLE 8

Into a glass reactor having a volume of 30 ml there were charged 1 g of oxaziridine (III) (3.5 mmoles), 0.35 g of tetrafluoroethylene (3.5 mmoles): and 0.35 mmoles of

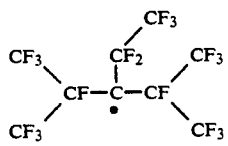

as initiator.

The reactor so charged was heated to 45° C. for 19 hours, then to 55° C. for 8 hours.

From the curde mixture, after distillation of volatile fractions and stripping at 70° C. for 3 hours, there were collected 0.42 g of a white solid polymer.

Polymerization yield: 31.1%

Elemental analysis: C=23.5%; N=1.05%; F=71.4%.

Infrared spectrum—main absorption bands: cm$^{-1}$ (intensity), 2361 (w), 1634 (w), 1238 (vs), 1136 (vs), 986 (m, stretching CF$_3$—N), 505 (s); vs=very strong, s=strong, w=weak.

EXAMPLE 9

In the same reactor of example 8 and following the same experimental procedure there were charged 1.3 g of oxaziridine (III) (4.6 mmoles), 0.23 g of tetrafluoroethylene (2.3 mmoles) and 0.35 mmoles of:

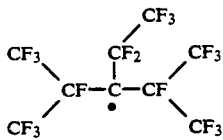

There were isolated 0.23 g of a white solid polymer.
Polymerization yield: 15.0%

Elemental analysis: C=23.3%; N=2.6%; F=70.0%.

The infrared spectrum shows the same pattern as described in example 8.

EXAMPLE 10

Into a steel reactor having a volume of 10 ml there were charged 0.450 g of oxaziridine (III) (1,6 mmols), 0.400 g of tetrafluoroethylene and 15 mg of a perfluoroalkane having formula:

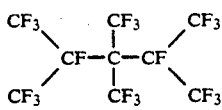

as initiator.

The calculated total pressure at 110° C. was of 18 kg/cm² abs. The reactor so charged was heated to 110° C. for 24 hours in the absence of light.

From the reaction raw product, after distillation of the most volatile fractions and stripping at 70° C. for 3 a hours time, there were isolated 0.250 g of a white solid polymer having the following elemental analysis:

C=24.26%; N=0,34%; F=71,9%.

The polymerization yield definited as in example 1 was of 29%.

The infrared spectra shows the same patterns as in the example 7.

What we claim is:

1. Polymeric perfluoroaminoethers having

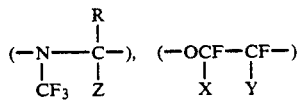

and optionally ($-CF_2-CF_2$) repeating units distributed at random in the chain and having the formula:

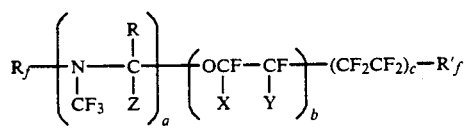

wherein $R_f$ and $R'_f$ are either equal or different from each other and represent:

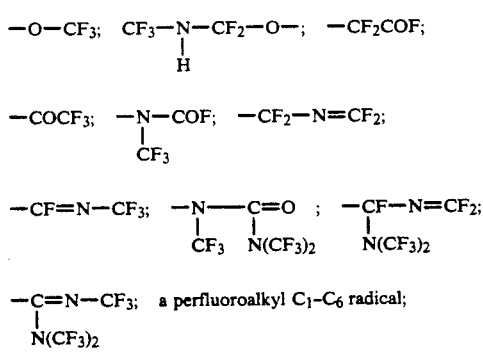

a perfluoroalkyl $C_1-C_6$ radical;

a, b are integers and c is an integer or zero;
$a+b+c \geq 2$
$a/b = 1$;
Z represents F or

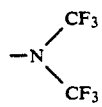

or a $C_1-C_{10}$ perfluoroalkyl group;

R represents F or a $C_1-C_{10}$ perfluoralkyl group, like or different from Z;

X and Y are defined as follows:
a) when at least one of R and Z is different from F, X and Y represent F and $CF_3$, so that if X=F then Y=$CF_3$ or vice versa and c=0, or both represent F; or
b) when R=Z=F, X represents F and Y represents a perfluoroalkyl $C_1-C_5$ group or vice versa and c=0, or both represent F.

2. A perfluoroaminoether of claim 1, which is prepared by a process which comprises reacting an oxaziridine of formula (I):

 (I)

wherein each R represents F or a perfluorogroup having 1-10 carbon atoms and R' is F or in group:

or a perfluorogroup having 1-10 carbon atoms, with a perfluoroolefin chosen between: $CF_3=CF_2$ and $CF_3CF=CF_2$ at temperatures ranging from −80° C. to 120° C. in the presence of ultra-violet radiation having a wave-length of from 2000 to 6000 A°.

3. The perfluoroaminoether of claim 2, wherein the temperature ranges from −50° C. to +50° C.

4. A perfluoroaminoether of claim 1, which is prepared by a process which comprises reacting an oxaziridine of formula (I):

 (I)

wherein each R represents F or a pefluoroalkyl group having 1 to 10 carbon atoms and R' is F or the group:

or a perfluoroalkyl group having from 1 to 10 carbon atoms, with a perfluoroolefin chosen between $CF_2=CF_2$ and $CF_3CF=CF_3$, at temperatures ranging from 0° C. to 200° C. in the presence of catalytic amounts of a chemical starter selected from the group consisting of peroxy compounds and perfluoroalkyl radicals generators.

5. A perfluoroaminoether according to claim 2, wherein the starting oxaziridine is selected from the group consisting of 2-(trifluoromethyl)-3,3-difluoro-oxaziridine (II) and 2-(trifluoromethyl)-3-(N,N-bis-trifluoromethyl)-oxaziridine (III).

6. A perfluoroaminoether according to claim 4, wherein the peroxy compound is:

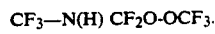

7. A perfluoroaminoether according to claim 4, wherein the perfluoroalkyl radical generator contains up to 9 carbon atoms.

8. A perfluoroaminoether according to claim 7, wherein the perfluoroalkyl radical generator is selected from the group consisting of:

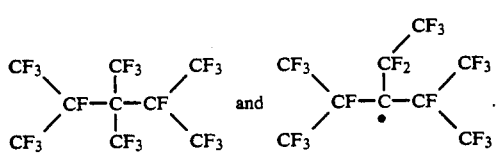

9. A perfluoroaminoether according to claim 4, wherein the peroxy compound or the perfluoroalkyl radical generator is employed in amounts between 0.5% and 5%, calculated by weight in respect of the reaction mixture.

10. A perfluoroaminoether according to claim 5, wherein the peroxy compound or the perfluroalkyl radical generator is employed in amounts between 0.5% and 5%, calculated by weight in respect of the reaction mixture.

11. A perfluoroaminoether according to claim 4, wherein the starting oxaziridine is selected from the group consisting of 2-(trifluoromethyl)-3,3-difluoro-oxaziridine (II) and 2-(trifluoromethyl)-3-(N,N-bis-trifluoromethyl)-oxaziridine (III).

12. A perfluoroanimoether according to claim 4, wherein the perfluoroalkyl radical generator contains up to 9 carbon atoms.

13. A perfluoroaminoether according to claim 12, wherein the perfluoroalkyl radical generator is selected from the group consisting of:

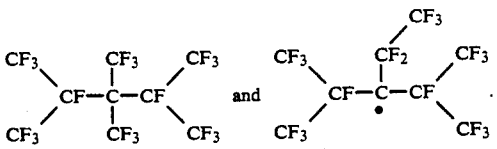

14. A perfluoroaminoether of claim 1, which is prepared by a process which comprises reacting an oxaziridine of formula (II):

with a R''FC=CF$_2$ perfluoroolefin where R'' is selected from the group consisting of F and perfluoroalkyl groups having up to 5 carbon atoms, at temperatures ranging from 0° C. to 200° C. in the presence of catalytic amounts of a chemical starter selected from the group consisting of peroxy compounds and perfluoroalkyl radicals generators.

15. A perfluoroaminoether according to claim 14, wherein the peroxy compound is:

16. A perfluoroaminoether according to claim 14, wherein the perfluoroalkyl radical generator contains up to 9 carbon atoms.

17. A perfluoroaminoether according to claim 11, wherein the perfluoroalkyl radical generator is selected from the group consisting of:

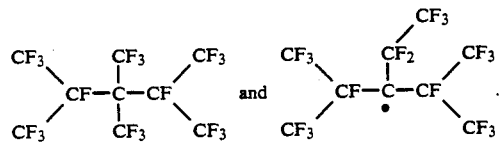

18. A perfluoroaminoether according to claim 11, wherein the peroxy compound or the perfluoroalkyl radical generator is employed in amounts between 0.5% and 5%, calculated by weight in respect of the reaction mixture.

* * * * *